L. C. JOSEPHS, Jr., AND G. WIRRER.
APPARATUS FOR THE HEAT TREATMENT OF METALS.
APPLICATION FILED MAR. 11, 1921.

1,402,722. Patented Jan. 3, 1922.

INVENTORS
Lyman C. Josephs Jr.
and Gottfried Wirrer
BY
Redding & Greeley
ATTORNEYS

UNITED STATES PATENT OFFICE.

LYMAN C. JOSEPHS, JR, OF ALLENTOWN, PENNSYLVANIA, AND GOTTFRIED WIRRER, OF PLAINFIELD, NEW JERSEY, ASSIGNORS TO INTERNATIONAL MOTOR COMPANY, OF NEW YORK, N. Y., A CORPORATION OF DELAWARE.

APPARATUS FOR THE HEAT TREATMENT OF METALS.

1,402,722.  Specification of Letters Patent.  Patented Jan. 3, 1922.

Application filed March 11, 1921. Serial No. 451,564.

*To all whom it may concern:*

Be it known that we, LYMAN C. JOSEPHS, Jr., and GOTTFRIED WIRRER, citizens, respectively, of the United States and the Swiss Republic, residing, respectively, in Allentown, in the State of Pennsylvania, and city of Plainfield, in the State of New Jersey, have invented certain new and useful Improvements in Apparatus for the Heat Treatment of Metals, of which the following is a specification, reference being had to the accompanying drawings, forming a part hereof.

In other applications for Letters Patent of the United States, made by the present applicants, renewal Ser. Nos. 464,568 and 464,569 filed April 26, 1921, there are described certain improvements in methods of heat treatment of metals, in accordance with which the determination of the critical point in the treatment of the metal is dependent upon the rate of change of dimension of the metal under treatment and the change in heat treatment is initiated through a change in the rate of change of dimension of the metal under treatment. In still another application, Ser. No. 390,797 filed June 22, 1920, also made by the present applicants, there is shown and described in detail one form of apparatus whereby the heat treatment is controlled through the change in dimension of the body of metal under treatment. That form of apparatus, although presented as an embodiment of the broad invention, is adapted to function when the rate of change of dimension of the metal under treatment is a change from a positive increase or expansion to a negative increase or contraction, it being assumed that the metal under treatment undergoes an actual contraction as it passes through its critical point. As pointed out in that application, however, another metal, as it passes through its critical point, might continue to expand but at a slower rate or it might continue to contract but at a higher rate, or it might suffer neither expansion nor contraction. In the present case it is sought to cover a form of apparatus for the control of the heat treatment, that is, for the initiation of a change in the heat treatment, whether it be of one kind or another, which will function when the metal under treatment does not contract as it passes through the critical point, but suffers a reduction in the rate of change, either to zero or to some rate less than the normal. In accordance with the present invention the metal under treatment during expansion at the normal rate causes one element of the controlling device to move with another independent element of the controlling device which is itself moved at a uniform rate by independent means, whereby, as the metal passes through its critical point and its rate of expansion is reduced, separation between said two elements will occur and thereby the change in the heat treatment will be initiated. One form of such apparatus is shown in our application Serial No. 390,797, filed June 22, 1920, while in the present application there is shown and described another form of apparatus which functions in a similar manner. In the drawing—

Figure 1:
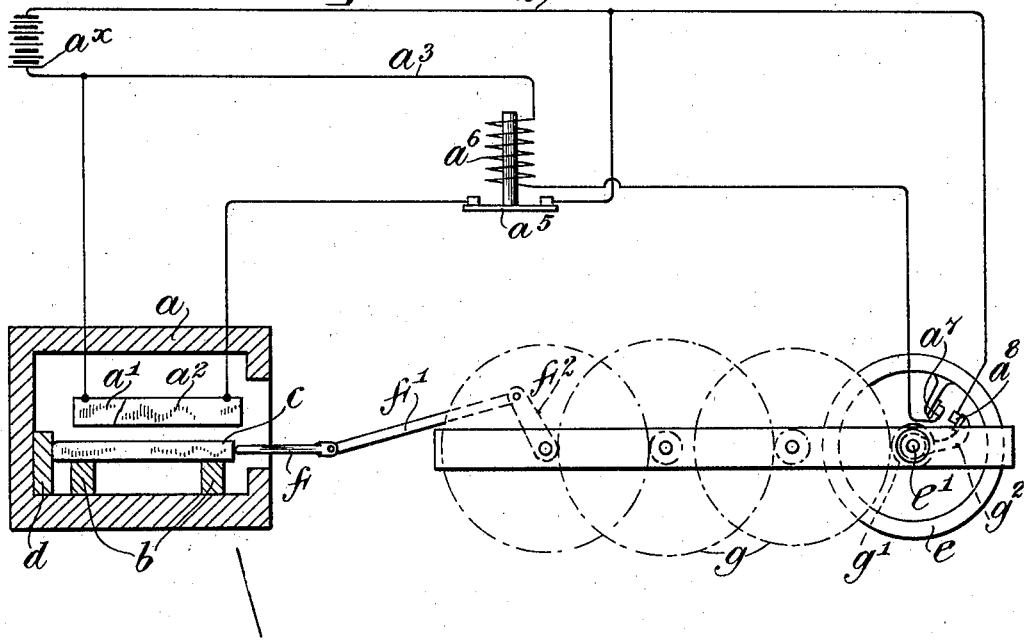
Figure 1 is a view partly sectional and partly diagrammatical illustrating a furnace, a mass of metal therein, and apparatus by which a reduction in the rate of expansion of the mass of metal initiates a change in the heat treatment.
Figure 2:
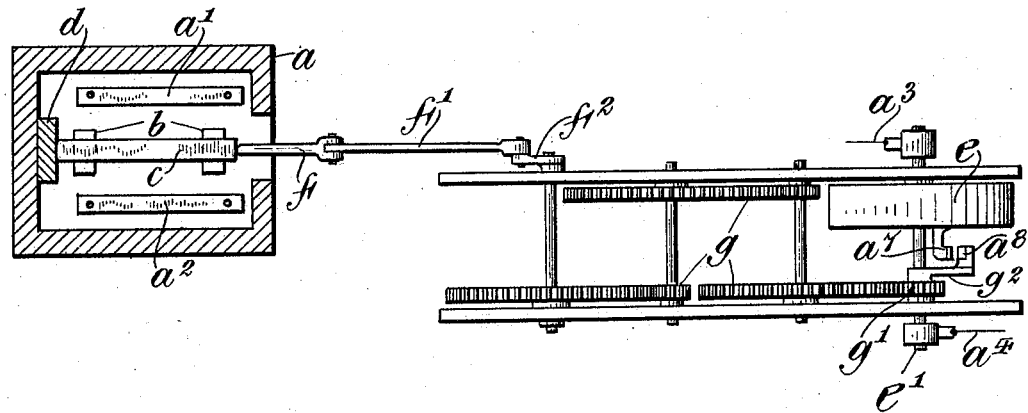
Figure 2 is a view of the same partly in horizontal section and partly in plan, the electrical connections being omitted.

In the drawing a furnace of any suitable character is indicated at $a$, and resting on suitable supports $b, b$ therein, is indicated a mass of metal $c$, with one end against an abutment $d$, while the other end is exposed through an aperture in the furnace wall. Electrical resistors or elements $a^1$, $a^2$ are suitably connected to a source of electricity indicated at $a^x$ through main leads $a^3$ and $a^4$, the resistors being connected to one of the leads as $a^4$, through a circuit breaker $a^5$ which is controlled by a coil $a^6$ of the other lead $a^3$. The two leads, $a^3$ and $a^4$ in the electrical arrangement illustrated are connected respectively to terminal contact elements $a^7$ and $a^8$, one of which is moved by the expansion of the mass of metal $c$ under treatment while the other is moved at a uniform rate by other means.

When any reduction in the rate of change of expansion of the mass of metal $c$ takes place, as when the metal passes through its critical point, the element $a^8$ moves at a lower rate than does the element $a^7$ and separation of the two elements therefore takes place. In the embodiment of the invention illustrated the separation of the two elements breaks, through the circuit breaker $a^5$, the circuit by which current is supplied to the heating elements $a^1$ and $a^2$ and thereby effects or initiates a change in the heat treatment.

In the construction shown the element $a^7$ is carried by a fly wheel $e$, mounted so as to rotate with a minimum of resistance and having substantial mass so that, when once set in motion, by any suitable means, it will continue to rotate at substantially the same rate of speed for an appreciable time. In the present instance the movement of the element $a^7$, that is, the rotation of the fly wheel $e$, is effected by the expansion of the mass of metal $c$ under treatment. For this purpose a rod $f$, suitably supported, is arranged to bear at one end against the mass of metal $c$ under treatment, while at the other end it is connected through a link $f^1$ with a crank $f^2$ on the shaft of the first of a train of gears $g$. The last of the train meshes with a pinion $g^1$ which is mounted loosely on the shaft $e^1$ of the fly wheel $e$ and, by an arm $g^2$, carries the element $a^8$. So long as the mass of metal $c$ continues to expand at a normal rate, the element $a^8$ bears against the element $a^7$, causing it to move and rotating the fly wheel $e$, but whenever the rate of expansion of the mass of metal $c$ falls, the rate of movement of the element $a^8$ will fall proportionately, but the rate of movement of the element $a^7$ will continue, under the influence of the momentum of the fly wheel, without appreciable reduction, for at least a sufficient time to permit the two elements to separate and thereby to initiate a change in the heat treatment of the mass of metal $c$. The train of gears $g$ is so arranged as to bring about large movement of the element $a^8$ through very small movement of the rod $f$.

The form of apparatus shown and described is but one embodiment of the invention and it will be understood that various changes will be made to suit different conditions of use and that the invention, except as pointed out in the claims, is not limited to the particular construction shown and described herein.

We claim as our invention:

1. In an apparatus for the heat treatment of metal, the combination of means to effect a change in the heat treatment and devices subject to a reduction in the rate of expansion of the metal under treatment whereby the actuation of said means is initiated.

2. In an apparatus for the heat treatment of metal, the combination of means to effect a change in the heat treatment, controlling devices therefor and devices subject to a reduction in the rate of expansion of the metal under treatment whereby the actuation of said controlling devices is initiated.

3. In an apparatus for the heat treatment of metal, the combination of means to effect a change in the heat treatment, controlling devices therefor and electro magnetic devices to initiate the actuation of said controlling devices and including circuit controlling devices subject to a reduction in the rate of expansion of the metal under treatment.

4. In an apparatus for the heat treatment of metal, the combination of an element, means to move the same at a uniform rate of speed, a second element, means whereby the same is moved by the expansion of the metal under treatment, means to effect a change in the heat treatment, and devices subject to a change in relation of said elements whereby the actuation of said last named means is initiated.

5. In an apparatus for the heat treatment of metal, the combination of a fly wheel, an element carried thereby, a second element mounted to move in contact with the first named element, means whereby the second named element is moved by the expansion of the metal under treatment, means to effect a change in the heat treatment, and devices subject to the separation of said elements whereby the actuation of said last named means is initiated.

6. In an apparatus for the heat treatment of metal the combination of a train of gears, means whereby said train of gears is set in motion by the expansion of the metal under treatment, a fly wheel mounted concentrically with but independently of the last gear of the train, contacts carried by said last named gear and said fly wheel respectively, means to effect a change in the heat treatment, and devices subject to a separation of said contacts whereby the actuation of said last named means is initiated.

This specification signed this 24 day of November, A. D. 1920.

LYMAN C. JOSEPHS, Jr.
GOTTFRIED WIRRER.